(12) United States Patent
Hase (10) Patent No.: US 11,115,544 B2
(45) Date of Patent: Sep. 7, 2021

(54) INFORMATION PROCESSING APPARATUS, CHARACTER RECOGNITION METHOD AND NON-TRANSITORY COMPUTER-READABLE RECORDING MEDIUM ENCODED WITH CHARACTER RECOGNITION INSTRUCTIONS

(71) Applicant: Konica Minolta, Inc., Tokyo (JP)

(72) Inventor: Junichi Hase, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/919,759

(22) Filed: Jul. 2, 2020

(65) Prior Publication Data
US 2021/0006670 A1 Jan. 7, 2021

(30) Foreign Application Priority Data
Jul. 2, 2019 (JP) .............................. JP2019-124011

(51) Int. Cl.
| H04N 1/40 | (2006.01) |
| H04N 1/00 | (2006.01) |
| G06K 9/03 | (2006.01) |
| H04N 1/32 | (2006.01) |
| H04N 1/44 | (2006.01) |

(52) U.S. Cl.
CPC ........... *H04N 1/00331* (2013.01); *G06K 9/03* (2013.01); *H04N 1/32096* (2013.01); *H04N 1/4406* (2013.01); *G06K 2209/01* (2013.01); *H04N 2201/0094* (2013.01)

(58) Field of Classification Search
CPC ........... H04N 1/00331; H04N 1/32096; H04N 1/4406; H04N 2201/0094; G06K 9/03; G06K 2209/01; G06K 9/325

USPC ......................................................... 358/1.14
See application file for complete search history.

(56) References Cited

U.S. PATENT DOCUMENTS

| 2006/0219773 | A1* | 10/2006 | Richardson | ............. G07F 19/00 235/379 |
| 2012/0011429 | A1* | 1/2012 | Kosaka | ................ G06K 9/2072 715/230 |
| 2012/0296992 | A1* | 11/2012 | Fylnn | ...................... H04L 51/04 709/206 |
| 2019/0012457 | A1* | 1/2019 | El-Moussa | .............. G06F 21/50 |
| 2019/0258428 | A1* | 8/2019 | Tokuchi | .............. G06F 3/04842 |
| 2020/0349551 | A1* | 11/2020 | Han | ...................... H04B 1/3827 |
| 2020/0371873 | A1* | 11/2020 | Schaefer | ............. G11C 11/2273 |

FOREIGN PATENT DOCUMENTS

| JP | 2002-279352 | * | 9/2002 | ............... G06K 9/68 |
| JP | 2002-279352 A | | 9/2002 | |
| JP | 2006-041623 A | | 2/2006 | |
| JP | 2015-103078 A | | 6/2015 | |

* cited by examiner

*Primary Examiner* — Jerome Grant, II
(74) *Attorney, Agent, or Firm* — Osha Bergman Watanabe & Burton LLP (57) ABSTRACT

An information processing apparatus includes a hardware processor that: accepts an image input from outside as an input image; recognizes a plurality of characters in the input image and produces character information that is constituted by the characters and includes a plurality of character strings; detects, from the character information, link information representing a network address of data; and corrects one or more of the character strings other than a character string that constitutes the link information among the character strings.

27 Claims, 8 Drawing Sheets

INFORMATION PROCESSING APPARATUS, CHARACTER RECOGNITION METHOD AND NON-TRANSITORY COMPUTER-READABLE RECORDING MEDIUM ENCODED WITH CHARACTER RECOGNITION INSTRUCTIONS

CROSS REFERENCE TO RELATED APPLICATIONS

The entire disclosure of Japanese patent Application No. 2019-124011 filed on Jul. 2, 2019, is incorporated herein by reference in its entirety.

BACKGROUND

Technical Field

The present invention relates to an information processing apparatus, a character recognition method and a non-transitory computer-readable recording medium encoded with character recognition instructions. The present invention relates to an information processing apparatus that recognizes a character in an image including link information representing a network address of data, a character recognition method executed in the information processing apparatus and a non-transitory computer-readable recording medium encoded with character recognition instructions that cause a computer to execute the character recognition method.

Description of the Related Art

In recent years, optical character recognition (OCR) for converting characters represented by images into electronic data has been known. Further, the technique for automatically correcting a character string into which an image has been converted by the OCR in order to improve accuracy of the OCR has been known.

Meanwhile, the contents on the Internet is specified by a URL (Uniform Resource Locator) indicating the location of the contents on the network. In the case where a URL into which an image has been converted by the OCR is corrected, the corrected URL might specify the contents of a risky website. In particular, URLs of risky websites are often confusingly similar to the URLs of well-known websites.

Japanese Patent Laid-Open No. 2002-279352 describes a character recognition device connected to the Internet, the character recognition device being characterized in comprising a character recognizer that recognizes a character in an input character image, an internet connector that connects to a connection destination indicated by a URL via the Internet and acquires a result, a result verifier that supplies a character string to the internet connector in the case where the character string recognized by the character recognizer is a URL and verifies a result of recognition, and being characterized in verifying whether a result of character recognition is correct.

However, although being able to confirm that the character string is a URL, the character recognition device described in Japanese Patent Laid-Open No. 2002-279352 is unable to confirm whether the character string is a URL of a risky website. Therefore, the URL represented by an image cannot be prevented from being converted by the OCR into a URL of a risky website.

SUMMARY

According to one or more embodiments of the present invention, an information processing apparatus includes an acceptor that accepts an image input from outside as an input image, and a hardware processor, wherein the hardware processor is configured to recognize a character in the input image and produce character information constituted by a plurality of characters, detect link information representing a network address of data from the character information, and correct one or more character strings other than a character string that constitutes the link information among a plurality of character strings included in the character information.

According to one or more embodiments of the present invention, an information processing apparatus includes an acceptor that accepts an image input from outside as an input image, and a hardware processor, wherein the hardware processor is configured to recognize a character in the input image and produce character information constituted by a plurality of characters, correct a character string included in the character information, detect link information representing a network address of data from correction information that is generated after the character information is corrected, and convert at least part of the link information included in the correction information into the character string before correction.

According to one or more embodiments of the present invention, a character recognition method causes an information processing apparatus to execute an acceptance step of accepting an image input from outside as an input image, and a character recognition step of recognizing a character in the input image and producing character information constituted by a plurality of characters, a pre-correction detection step of detecting link information representing a network address of data from the character information, and a correction step of correcting one or more character strings other than a character string that constitutes the link information among a plurality of character strings included in the character information.

According to one or more embodiments of the present invention, a character recognition method causes an information processing apparatus to execute an acceptance step of accepting an image input from outside as an input image, and a character recognition step of recognizing a character in the input image and producing character information constituted by a plurality of characters, a correction step of correcting a character string included in the character information, a post-correction detection step of detecting link information representing a network address of data from correction information that is generated after the character information is corrected in the correction step; and a conversion step of converting at least part of the link information included in the correction information into the character string before correction in the correction step.

According to one or more embodiments of the present invention, a non-transitory computer-readable recording medium is encoded with a character recognition instructions executed by a computer controlling an information processing apparatus, the character recognition instructions cause the computer to accept an image input from outside as an input image, recognize a character in the input image and produce character information constituted by a plurality of characters, detect link information representing a network address of data from the character information, and correct one or more character strings other than a character string that constitutes the link information among a plurality of character strings included in the character information.

According to one or more embodiments of the present invention, a non-transitory computer-readable recording medium is encoded with a character recognition instructions executed by a computer controlling an information processing apparatus, the character recognition instructions cause the computer to accept an image input from outside as an input image, recognize a character in the input image and produce character information constituted by a plurality of characters, correct a character string included in the character information, detect link information representing a network address of data from the correction information that is generated after the character information is corrected, and convert at least part of the link information included in the correction information into the character string before correction.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Therefore, a detailed description thereof will not be repeated.

Figure 1:
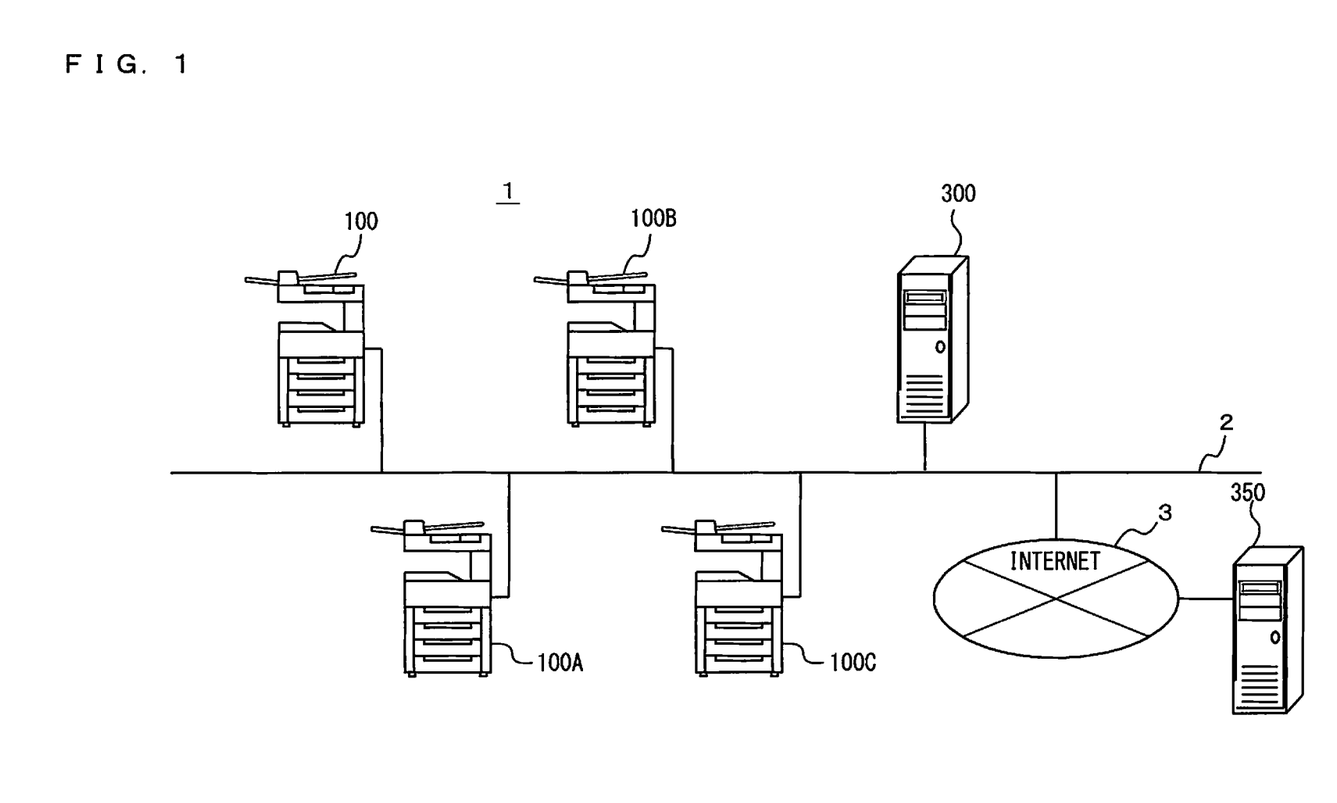
FIG. 1 is a diagram showing an overview of a data processing system in one or more embodiments of the present invention.

FIG. 1 is a diagram showing an overview of a data processing system in one or more embodiments of the present invention. Referring to FIG. 1, the data processing system 1 includes MFPs (Multi Function Peripherals) 100, 100A, 100B, 100C and a server 300 that are respectively connected to a network 2. The MFPs 100, 100A, 100B, 100C are one example of an information processing apparatus, and include a plurality of functions such as a scan function, a print function, a copy function, a facsimile transmission reception function and a communication function.

The network 2 is a Local Area Network (LAN), either wired or wireless. Further, the network 2 is not limited to a LAN and may be a Wide Area Network (WAN), a Public Switched Telephone Network (PSTN) or the like. The network 2 is connected to the Internet 3 via a gateway, and the MFPs 100, 100A, 100B, 100C can respectively communicate with a server 350 connected to the Internet 3.

The server 300 is a general computer. The server 300 produces and stores a blacklist including a high-risk URL (Uniform Resource Locator). The technique, which the server 300 uses to produce the blacklist, has been known conventionally. Therefore, a description thereof will not be repeated. The blacklist stored in the server 300 may define a risk level for each URL. The risk level indicates how risky each URL is. The higher the risk level is, the higher the risk is. For example, the higher the risk of distributing a computer virus is, the higher the risk level is set. Further, the risk level may be used as a predetermined reference for access permission. For example, the risk level of an age-restricted website is high. The blacklist stored in the server 300 may include a risky URL without defining its risk level. While the server 300 stores the blacklist here, the URL list may be stored in the server 350.

While the MFPs 100, 100A, 100B, 100C are described as one example of the information processing apparatus in one or more embodiments, the present invention is not limited to this. As long as including the function of inputting and outputting data, the data processing apparatus may be a personal computer, a scanner, a printer or a facsimile machine, for example. Each of the MFPs 100, 100A, 100B, 100C has the same functions. Here, the MFP 100 will be described by way of example.

Figure 2:
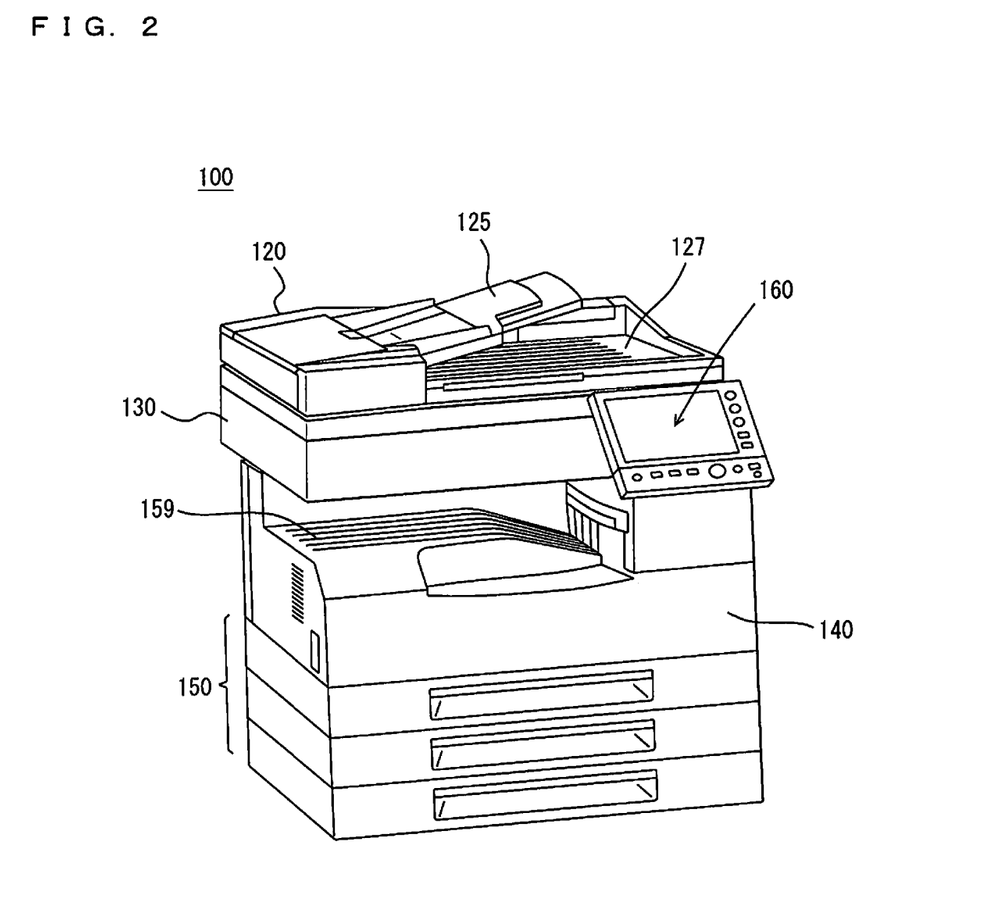
FIG. 2 is a perspective view showing the appearance of an MFP in one or more embodiments.
Figure 3:
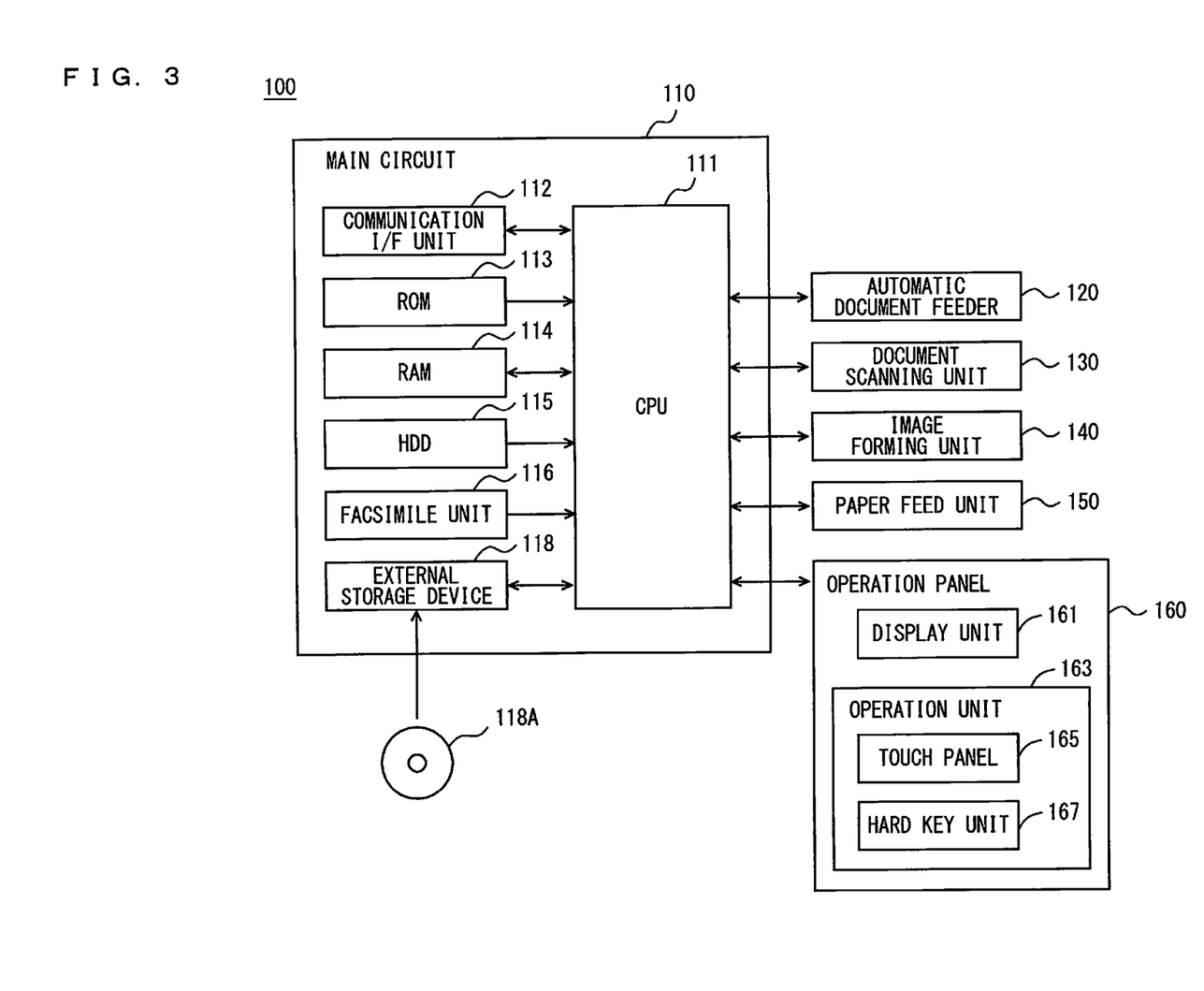
FIG. 3 is a block diagram showing the outline of the hardware configuration of the MFP in one or more embodiments.

FIG. 2 is a perspective view showing the appearance of the MFP in one or more embodiments. FIG. 3 is a block diagram showing the outline of the hardware configuration of the MFP in one or more embodiments. Referring to FIGS. 2 and 3, the MFP 100 includes a main circuit 110, a document scanning unit 130 for scanning a document, an automatic document feeder 120 for conveying a document to the document scanning unit 130, an image forming unit 140 for forming an image on a paper (a sheet of paper) based on image data, a paper feed unit 150 for supplying papers to the image forming unit 140 and an operation panel 160 serving as a user interface.

The automatic document feeder 120 automatically conveys a plurality of documents set on a document tray 125 to a document scan position of the document scanning unit 130 one by one, and discharges the document including an image that is scanned by the document scanning unit 130 onto a document discharge tray 127.

The document scanning unit 130 includes an exposure lamp and a CCD (Charge Coupled Devices) sensor that photoelectrically converts the received light into an electric signal. The exposure lamp exposes the document set at the scan position. The light emitted from the exposure lamp is reflected by the document. The light reflected from the document forms an image on the CCD sensor. The CCD sensor converts the reflected light that has formed an image on a light receiving surface into document data as an electric signal and outputs the document data to a CPU (central processing unit) (or hardware processor) 111. In the CCD sensor, an optoelectronic transducer is arranged in a main scan direction. The document scanning unit 130 moves the position of the document irradiated with the light emitted by the exposure lamp in a sub-scan direction perpendicular to the main scan direction, thereby outputting two-dimensional document data. The positions of the document and the exposure lamp relative to each other are changed in the sub-scan direction, whereby the position of the document irradiated with the light emitted by the exposure lamp is moved.

The image forming unit 140 is controlled by the CPU 111 and forms an image on the paper conveyed by the paper feed unit 150 using a well-known electrophotographic method. In one or more embodiments, the image forming unit 140 forms an image of the image data received from the CPU 111 on the paper conveyed by the paper feed unit 150 according to an image forming condition. The paper on which an image is formed is discharged to a paper discharge tray 159. The image data output by the CPU 111 to the image forming unit 140 includes image data representing an image of print data that is received from the outside in addition to the image data received from the document scanning unit 130.

The main circuit 110 includes the CPU 111 for controlling the entire MFP 100, a communication interface (I/F) 112, a ROM (Read Only Memory) 113, a RAM (Random Access Memory) 114, a hard disc drive (HDD) 115 that is used as a mass storage device, a facsimile unit 116 and an external storage device 118. The CPU 111 is connected to the automatic document feeder 120, the document scanning unit 130, the image forming unit 140, the paper feed unit 150 and the operation panel 160, and controls the MFP 100 as a whole.

The ROM 113 stores instructions to be executed by the CPU 111 or data required for execution of the instructions. The RAM 114 is used as a work area when the CPU 111 executes the instructions. Further, the RAM 114 temporarily stores image data successively transmitted from the document scanning unit 130.

The operation panel 160 is provided in an upper part of the MFP 100. The operation panel 160 includes a display unit 161 and an operation unit 163. The display unit 161 is a Liquid Crystal Display (LCD), for example, and displays instruction menus to users, information about the acquired image data and the like. As long as displaying images, an organic EL (Electroluminescence) display, for example, can be used instead of the LCD.

The operation unit 163 includes a touch panel 165 and a hard key unit 167. The touch panel 165 is a capacitance type. Not only the capacitance type but also other types such as a resistive film type, a surface acoustic wave type, an infrared type and an electromagnetic induction type can be used for the touch panel 165.

The touch panel 165 is provided with its detection surface superimposed on an upper surface or a lower surface of the display unit 161. Here, the size of the detection surface of the touch panel 165 and the size of the display surface of the display unit 161 are the same. Therefore, the coordinate system of the display surface and the coordinate system of the detection surface are the same. The touch panel 165 detects the position designated by the user in the display surface of the display unit 161 and outputs the coordinates of the detected position to the CPU 111. The coordinate system of the display surface and the coordinate system of the detection surface are the same, so that the coordinates output by the touch panel 165 can be replaced with the coordinates of the display surface.

The hard key unit 167 includes a plurality of hard keys. The hard keys are contact switches, for example. The touch panel 165 detects the position designated by the user on the display surface of the display unit 161. In the case where (i.e., when) operating the MFP 100, the user is likely to be in an upright attitude. Thus, the display surface of the display unit 161, the operation surface of the touch panel 165 and the hard key unit 167 are arranged to face upward. This is for the purpose of enabling the user to easily view the display surface of the display unit 161 and easily give an instruction to the operation unit 163 with his or her finger.

The communication I/F unit 112 is an interface for connecting the MFP 100 to the network 2. The communication I/F unit 112 communicates with another computer connected to the network 2 using a communication protocol such as a TCP (Transmission Control Protocol) or a FTP (File Transfer Protocol).

The facsimile unit 116 is connected to the Public Switched Telephone Network (PSTN), transmits facsimile data to the PSTN or receives facsimile data from the PSTN. The facsimile unit 116 stores the received facsimile data in the HDD 115, and converts the received facsimile data into print data that can be printed by the image forming unit 140 to output the print data to the image forming unit 140. Thus, the image forming unit 140 forms the image represented by the facsimile data received from the facsimile unit 116 on a paper. Further, the facsimile unit 116 converts the data stored in the HDD 115 into facsimile data and transmits the converted facsimile data to a facsimile machine connected to the PSTN.

The external storage device 118 is controlled by the CPU 111 and mounted with a CD-ROM (Compact Disk Read Only Memory) 118A or a semiconductor memory. While the CPU 111 executes instructions stored in the ROM 113 by way of example in one or more embodiments, the CPU 111 may control the external storage device 118, read out the instructions to be executed by the CPU 111 from the CD-ROM 118A, store the read instructions in the RAM 114 and execute the instructions.

A recording medium for storing instructions to be executed by the CPU 111 is not limited to the CD-ROM 118A but may be a flexible disk, a cassette tape, an optical disc (MO(Magnetic Optical Disc)/MD(Mini Disc)/DVD (Digital Versatile Disc)), an IC card, an optical card, or a semiconductor memory such as a mask ROM or an EPROM (Erasable Programmable ROM). Further, the CPU 111 may download instructions from a computer connected to the network 2 and store the instructions in the HDD 115. Alternatively, the computer connected to the network 2 may write instructions in the HDD 115, and then the instructions stored in the HDD 115 may be loaded into the RAM 114 to be executed in the CPU 111. The instructions referred to here includes not only instructions directly executable by the CPU 111 but also source instructions, compressed instructions, encrypted instructions and the like.

Figure 4:
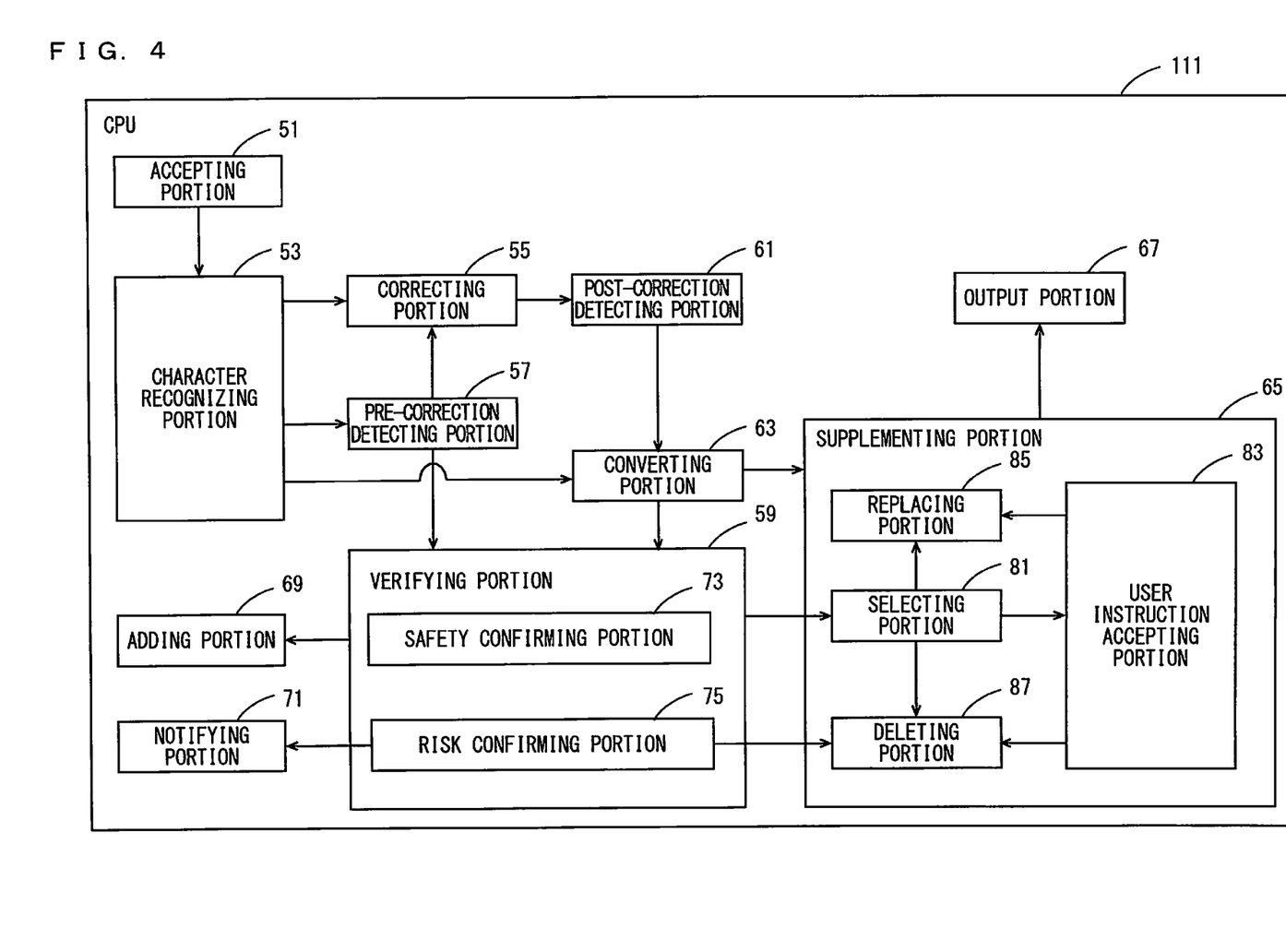
FIG. 4 is a function block diagram showing one example of functions of a CPU included in the MFP in one or more embodiments.

FIG. 4 is a function block diagram showing one example of the functions of the CPU included in the MFP in one or more embodiments. The functions shown in FIG. 4 are the functions implemented by the CPU 111 when the CPU 111 included in the MFP 100 executes a character recognition program. Referring to FIG. 4, the CPU 111 includes an accepting portion 51, a character recognizing portion 53, a correcting portion 55, a pre-correction detecting portion 57, a verifying portion 59, a post-correction detecting portion 61, a converting portion 63, a supplementing portion 65, an output portion 67, an adding portion 69 and a notifying portion 71.

The accepting portion 51 accepts an image received from the outside as an input image. The image received from the outside includes image data that is output by the document scanning unit 130 that has scanned a document, and image data received by the communication I/F unit 112 from an external computer. Specifically, the accepting portion 51 controls the document scanning unit 130 and causes the document scanning unit 130 to optically scan the image formed on the document and accepts the image data that is output by the document scanning unit 130 as the input image. Further, in the case where controlling the communication I/F unit 112 to receive the image data transmitted by any of the other MFPs 100A, 100B, the accepting portion 51 accepts the image data as the input image. The accepting portion 51 outputs the input image to the character recognizing portion 53.

The character recognizing portion 53 recognizes characters in the input image, and produces the character information constituted by a plurality of characters represented in the input image. The character recognizing portion 53 outputs the character information to the correcting portion 55, the pre-correction detecting portion 57 and the converting portion 63.

The pre-correction detecting portion 57 detects link information from the character information received from the character recognizing portion 53. Specifically, the pre-correction detecting portion 57 detects a group of character strings starting with character strings defined as scheme names of URLs from the character information as the link information. The scheme names are "http," "https," "news" or "nntp," for example. The pre-correction detecting portion 57 outputs the detected link information to the correcting portion 55, the post-correction detecting portion 61 and the verifying portion 59. Further, the pre-correction detecting portion 57 may be prevented from detecting a character string including a character or a format that cannot be used in a URL as the link information.

The correcting portion 55 corrects a plurality of character strings included in the character information. In the case where receiving the link information from the pre-correction detecting portion 57, the correcting portion 55 corrects a character string other than the link information among the plurality of character strings included in the character information. In other words, the correcting portion 55 does not correct a character string including the link information. The technique for correcting a character string is well known, so that a description thereof will not be repeated here. Here, the correcting portion 55 corrects a character string using a dictionary prepared in advance. The technique for correcting a character string is not limited to the method of correcting a character string using a dictionary, and a character string may be corrected with use of another method. The correcting portion 55 outputs the character information generated after a character string included in the character information is corrected to the post-correction detecting portion 61 as correction information.

The post-correction detecting portion 61 detects link information other than the link information detected by the pre-correction detecting portion 57 from the correction information. Specifically, the post-correction detecting portion 61 detects a group of character string starting with character strings defined as scheme names of URLs from the correction information as the link information. The correction information might include link information other than the link information detected from the character information before correction. For example, a character string that is not a scheme name in the character information before correction might be corrected to a scheme name. Further, the post-correction detecting portion 61 does not detect a character string including a character or a format that cannot be used in a URL as the link information. In the case where detecting the link information, the post-correction detecting portion 61 outputs a set of the link information and the correction information to the converting portion 63.

The converting portion 63 receives the character information from the character recognizing portion 53, and receives the set of the link information and the correction information from the post-correction detecting portion 61. The converting portion 63 converts at least part of the link information included in the correction information into the character string before correction. Specifically, a character string other than a scheme name in the link information is converted into the character string before correction. The converting portion 63 specifies the character string other than a scheme name in the link information included in the correction information, and replaces the character string with the corresponding character string included in the character information. The converting portion 63 outputs the correction information in which part of the link information has been converted to the supplementing portion 65, and outputs the partially converted link information to the verifying portion 59.

The verifying portion 59 verifies accessibility of the data specified by the link information. The verifying portion 59 verifies the accessibility of the data specified by the link information in regard to each of the link information received from the pre-correction detecting portion 57 and the link information received from the converting portion 63. The verifying portion 59 includes a safety confirming portion 73 and a risk confirming portion 75.

The safety confirming portion 73 confirms whether access to the data specified by the link information is permitted. Specifically, the safety confirming portion 73 confirms that access is permitted in regard to the link information to be verified based on a whitelist. The whitelist is a table that defines network addresses to which access is permitted and is stored in the HDD 115 in advance. In the case where the link information to be verified is registered in the whitelist, the safety confirming portion 73 confirms that access to the data specified by the link information to be verified is permitted. In the case where the link information to be verified is not registered in the whitelist, the safety confirming portion 73 confirms that access to the data specified by the link information to be verified is not permitted.

The risk confirming portion 75 confirms whether access to the data specified by the link information is forbidden. Specifically, the risk confirming portion 75 confirms that access is forbidden in regard to the link information to be verified based on the blacklist. The blacklist is a table that defines network addresses to which access is forbidden and is acquired from the server 300. The blacklist may be acquired from the server 350 connected to the Internet 3. In this case, in the case where a network address is provided with a risk level in the blacklist, a network address having a predetermined risk level or higher may be set as a network address to which access is forbidden. In the case where the link information to be verified is registered in the blacklist, the risk confirming portion 75 confirms that access to the data specified by the link information to be verified is forbidden. In the case where the link information to be verified is not registered in the blacklist, the risk confirming portion 75 confirms that access to the data specified by the link information to be verified is not forbidden.

Further, the risk confirming portion 75 may acquire computer virus definition data from the outside and confirm forbidding of access based on the computer virus definition data. Specifically, the risk confirming portion 75 acquires the computer virus definition data from the server 350 connected to the Internet 3. Further, the risk confirming portion 75 controls the communication I/F unit 112 to acquire the data specified by the link information, and confirms that access to the data specified by the link information is forbidden using the computer virus definition data. For example, in the case where the data specified by the link information includes the data defined by the computer virus definition data, it is confirmed that access is forbidden.

The verifying portion 59 outputs a set of the link information and the verification result to the supplementing portion 65, the adding portion 69 and the notifying portion 71. The verification result is any one of the result indicating permission of access, the result indicating forbidding of access and the result indicating that access is neither permitted nor forbidden.

In the case where receiving a set of link information and a result indicating that access is neither permitted nor forbidden from the verifying portion 59, the adding portion 69 adds the link information to the whitelist.

In the case where receiving a set of link information and a result indicating forbidding of access from the verifying portion 59, the notifying portion 71 notifies the user. For example, a message indicating inclusion of a URL having a risk of computer virus infection is displayed in the display unit 161. Further, the user is notified of a risk of computer virus infection by generation of a warning sound. Further, the notifying portion 71 may notify an administrator who administers the MFP 100 by sending an email or the like.

The supplementing portion 65 supplements the correction information received from the converting portion 63 based on the verification result received from the verifying portion 59. The supplementing portion 65 outputs the correction information after supplementation to the output portion 67. The supplementing portion 65 includes a selecting portion 81, a user instruction accepting portion 83, a replacing portion 85 and a deleting portion 87.

In the case where the link information similar to the link information received from the verifying portion 59 is registered in the whitelist, the selecting portion 81 selects the similar link information as the safe link information. In the case where a plurality of link information pieces similar to the link information received from the verifying portion 59 are registered in the whitelist, the selecting portion 81 selects the plurality of similar link information pieces as a plurality of safe link information pieces. The selecting portion 81 outputs the safe link information to the user instruction accepting portion 83.

The user instruction accepting portion 83 accepts an instruction for replacing the link information with the safe link information. Specifically, in the case where the safe link information is displayed on the display unit 161, and an operation of providing an instruction for replacing the link information with the safe link information is input to the operation unit 163, the user instruction accepting portion 83 accepts a replacing instruction. In the case where the plurality of safe link information pieces are selected by the selecting portion 81, the instruction provided by the user includes an instruction for selecting one safe link information piece with which the link information is to be replaced from the plurality of safe link information pieces. Further, the URL input by the user to the operation unit 163 may be accepted as the safe link information. In the case where receiving an operation of giving an instruction for replacing the link information with the one safe link information piece, the user instruction accepting portion 83 outputs a replacing instruction to the replacing portion 85. If not, the user instruction accepting portion 83 outputs a deleting instruction to the deleting portion 87 without outputting a replacing instruction to the replacing portion 85. The replacing instruction includes a set of the link information and the safe link information. The deleting instruction includes the link information.

The replacing portion 85 replaces the link information included in the correction information with the safe link information that pairs with the link information. Even in the case where access to the data specified by the link information is forbidden, the link information is to be replaced with the safe link information. Thus, the correction information can be prevented from including the link information to which access is forbidden.

In the case where the link information included in the deleting instruction is included in the link information to which access is forbidden according to the risk confirming portion 75, the deleting portion 87 deletes the link information included in the deleting instruction from the correction information. Thus, in the case where access to the data specified by the link information is forbidden, the link information is deleted from the correction information. Therefore, the correction information can be prevented from including the link information to which access is forbidden.

The output portion 67 outputs the correction information to the outside. The output portion 67 outputs the correction information to the image forming unit 140 and forms an image of the correction information on a paper. Further, in the case where a user's operation of inputting to the operation unit 163 is an operation of providing an instruction for storing the correction information in the HDD 115, the output portion 67 stores the correction information in the HDD 115. In the case where a user's operation of inputting to the operation unit 163 is an operation of providing an instruction for transmitting the correction information to an external computer, the output portion 67 transmits the correction information via the communication I/F unit 112.

Figure 5:
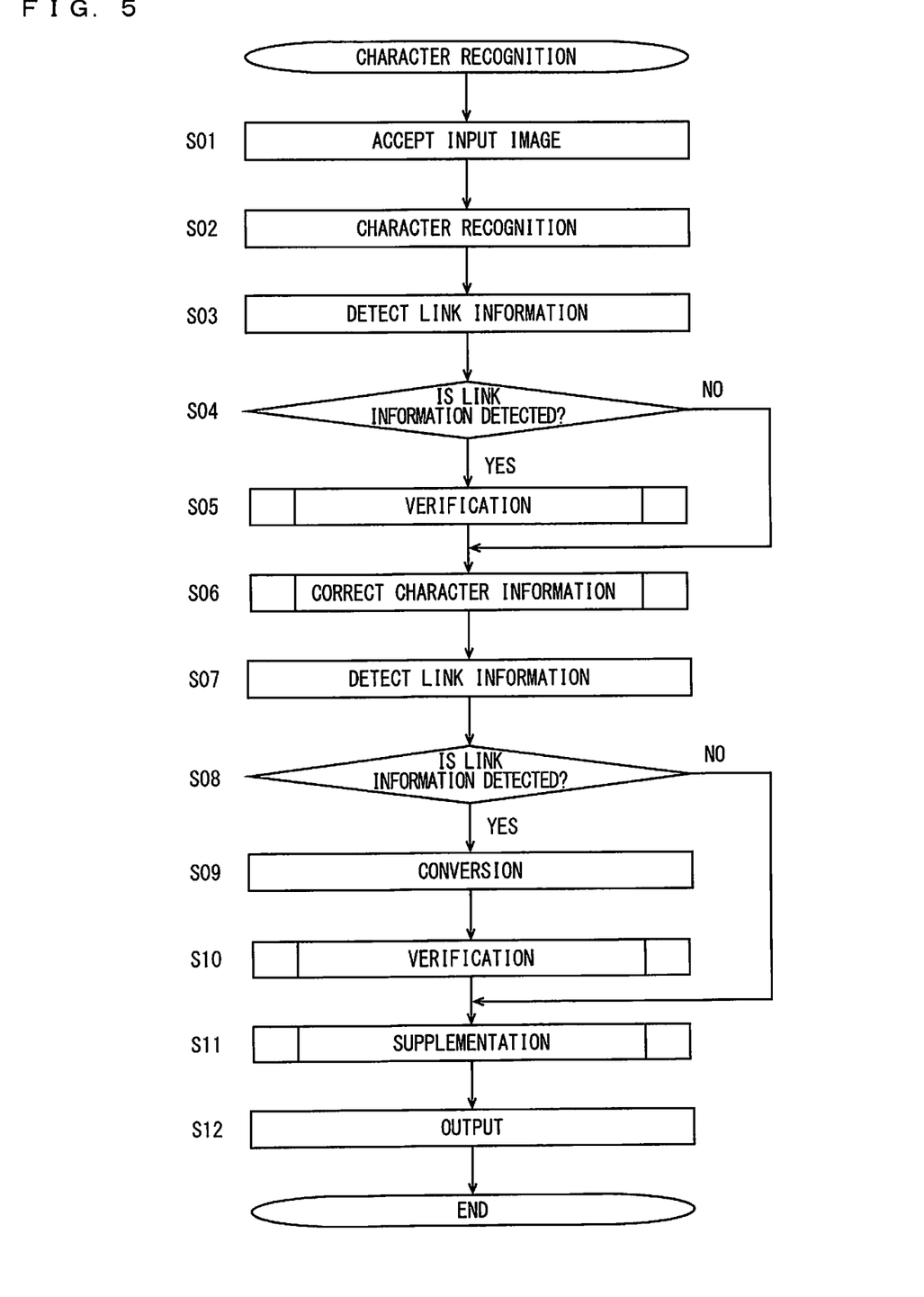
FIG. 5 is a flowchart showing one example of a flow of a character recognition process in one or more embodiments.

FIG. 5 is a flowchart showing one example of a flow of a character recognition process. The character recognition process is a process executed by the CPU 111 when the CPU 111 included in the MFP 100 executes the character recognition instructions. Referring to FIG. 5, the CPU 111 accepts an image received from the outside as an input image (step S01), and the process proceeds to the step S02. The input image includes image data that is output by the document scanning unit 130 that has scanned a document, and image data received by the communication I/F unit 112 from an external computer.

In the step S02, the CPU 111 recognizes characters in the input image, and the process proceeds to the step S03. The characters in the input image are recognized, and the character information constituted by a plurality of characters shown in the input image is produced. In the step S03, link information is detected from the character information, and the process proceeds to the step S04. A group of character strings starting with character strings that are defined as scheme names of URLs is detected from the correction information as the link information. A character string including a character or a format that cannot be used in an URL may be prevented from being detected as the link information.

In the step S04, the CPU 111 determines whether the link information has been extracted. If the link information has been detected, the process proceeds to the step S05. If not, the process proceeds to the step S06. In the step S05, a verification process is executed, and the process proceeds to the step S06. Although details of the verification process will be described below, the verification process is a process of determining whether access to the data specified by the link information is permitted or whether access to the data specified by the link information is forbidden. In the step S06, a character information correction process is executed, and the process proceeds to the step S07. Although details of the character information correction process will be described below, the character information correction process is a process of correcting a character string other than link information among a plurality of character strings included in the character information. The character information correction process is executed, so that the correction information is generated after the character information is corrected.

In the step S07, the link information is detected from the correction information, and the process proceeds to the step S08. A group of character strings starting with character strings that are defined as scheme names of URLs is detected from the correction information as the link information. The correction information might include link information other than the link information detected from the character information before correction. A character string including a character or a format that cannot be used in an URL may be prevented from being detected as the link information.

In the step S08, the CPU 111 determines whether the link information has been detected. If the link information has been detected, the process proceeds to the step S09. If not, the process proceeds to the step S11. In the step S09, at least part of a character string of the link information is converted into a character string before correction, and the process proceeds to the step S10. Specifically, a character string other than a scheme name in the link information included in the correction information is specified, and the character string is replaced with a character string before correction included in the character information.

In the step S10, the verification process is executed in regard to the link information converted in the step S09 similarly to the step S05, and the process proceeds to the step S11. In the step S11, a supplementation process is executed, and the process proceeds to the step S12. Although details of the supplementation process will be described below, the supplementation process is a process of supplementing the link information included in the correction information.

Figure 6:
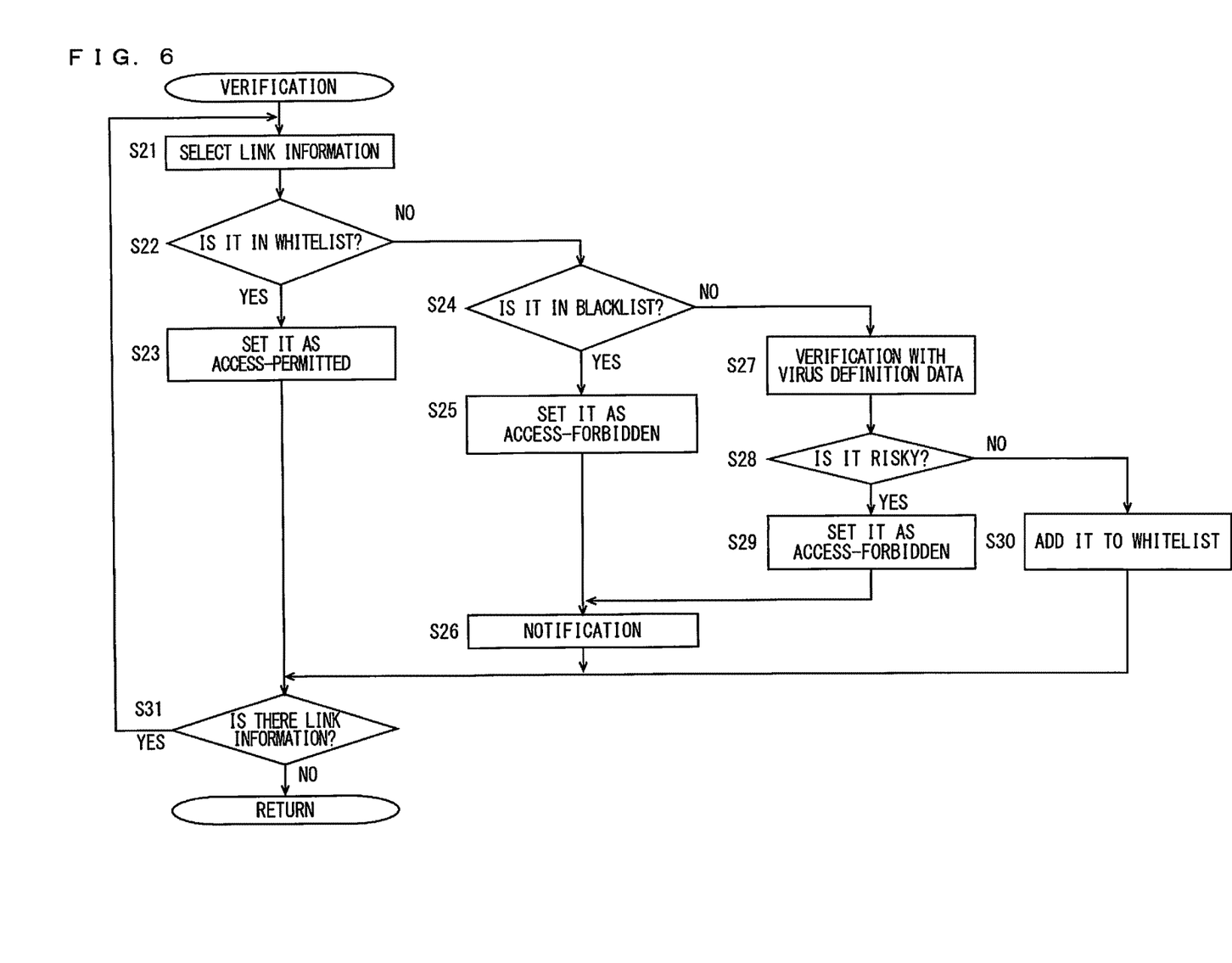
FIG. 6 is a flowchart showing one example of a flow of a verification process in one or more embodiments.

FIG. 6 is a flowchart showing one example of a flow of the verification process. The verification process is a process executed in each of the steps S05 and S10 of the character recognition process. One or more link information pieces are selected before the verification process is executed. Referring to FIG. 6, the CPU 111 selects the link information to be processed (step S21), and the process proceeds to the step S22. In the step S22, the CPU 111 determines whether the link information selected as the link information to be processed is registered in the whitelist. If the link information is registered in the whitelist, the process proceeds to the step S23. If not, the process proceeds to the step S24. In the step S23, the link information that is selected as the link information to be processed is set as the link information to which access is permitted, and the process proceeds to the step S31. In the case where the link information is set as the link information to which access is permitted, permission of access to the data specified by the link information is indicated.

In the step S24, the CPU 111 determines whether the link information that is selected as the link information to be processed is registered in the blacklist. If the link information is registered in the blacklist, the process proceeds to the step S25. If not, the process proceeds to the step S27. In the step S25, the link information that is selected as the link information to be processed is set as the link information to which access is forbidden, and the process proceeds to the step S26. In the case where the link information is set as the link information to which access is forbidden, forbidding of access to the data specified by the link information is indicated. In the step S26, the user is notified, and the process proceeds to the step S31. For example, a message indicating inclusion of a URL having a risk of computer virus infection is displayed in the display unit 161. Further, the user is notified of a risk of computer virus infection by generation of a warning sound.

In the step S27, the link information is verified based on the computer virus definition data, and the process proceeds to the step S28. The CPU 111 confirms that access to the link information is forbidden based on the computer virus definition data acquired from the outside. Specifically, the computer virus definition data is acquired in advance from the server 350 connected to the Internet 3. The CPU 111 controls the communication I/F unit 112 to acquire the data specified by the link information. Then, the CPU 111 confirms that access to the data specified by the link information is forbidden using the computer virus definition data. For example, in the case where the data specified by the link information includes the data defined by the computer virus definition data, it is confirmed that access is forbidden.

In the step S28, the process branches depending on a result of verification in the step S27. If the result of verification indicates that the data specified by the link information has a risk of computer virus infection, the process proceeds to the step S29. If not, the process proceeds to the step S30. In the step S29, the link information selected as the link information to be processed is set as the link information to which access is forbidden similarly to the step S25, and the process proceeds to the step S26. The user is notified in the step S26, and the process proceeds to the step S31. The link information to be processed is added to the whitelist in the step S30, and the process proceeds to the step S31.

In the step S31, the CPU 111 determines whether the link information that is not selected as the link information to be processed in the step S21 is present. If an unselected link information is present, the process returns to the step S21. If not, the process returns to the character recognition process.

Figure 7:
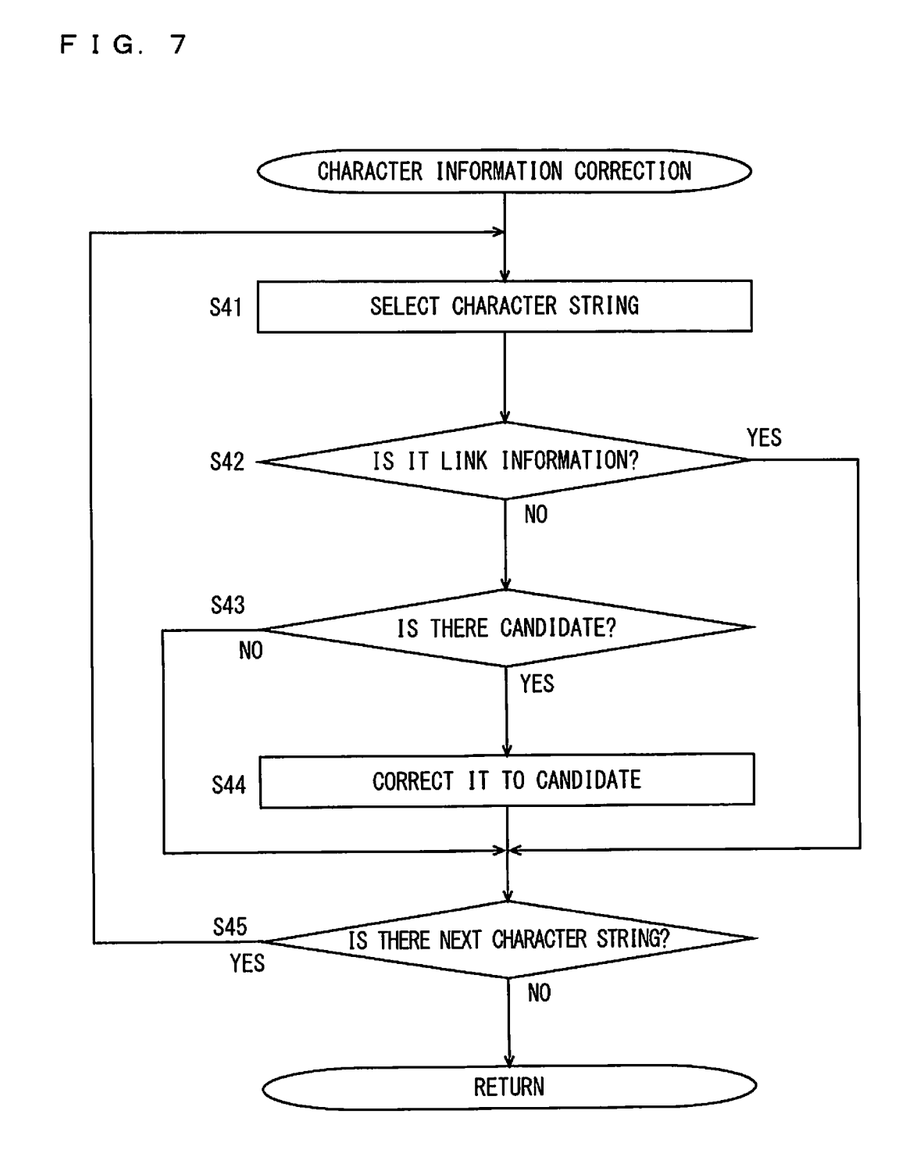
FIG. 7 is a flowchart showing one example of a flow of a character information correction process in one or more embodiments.

FIG. 7 is a flowchart showing one example of a flow of a character information correction process. The character information correction process is a process executed in the step S06 of the character recognition process. Referring to FIG. 7, the CPU 111 selects a character string to be processed from among a plurality of character strings included in the character information (step S41), and the process proceeds to the step S42. In the step S42, the CPU 111 determines whether the character string selected as the character string to be processed is the link information. If the character string constitutes part of the link information, the process proceeds to step S45. If not, the process proceeds to the step S43. That is, the character string constituting the link information is not to be corrected.

In the step S43, the CPU 111 determines whether a candidate with which the character string to be processed is to be replaced is present. In the case where a character string that is similar to or related to the character string that is selected as a character string to be processed is present in the dictionary stored in advance, the character string is determined as the candidate. If a character string similar to or related to the character string that is selected as a character string to be processed is present in the dictionary stored in advance, the process proceeds to the step S44. If not, the process proceeds to the step S45. In the step S45, the character information is corrected to the candidate character string, and the process proceeds to the step S45. The character string that is to be processed and is included in the character information is replaced with the candidate character string included in the dictionary, whereby the character information is corrected to the candidate character string.

In the step S45, the CPU 111 determines whether a character string that is to be selected as a character string to be processed is present. If the character information includes a character string that is not selected as a character string to be processed, the process returns to step S41. If not, the process returns to the character recognition process.

Figure 8:
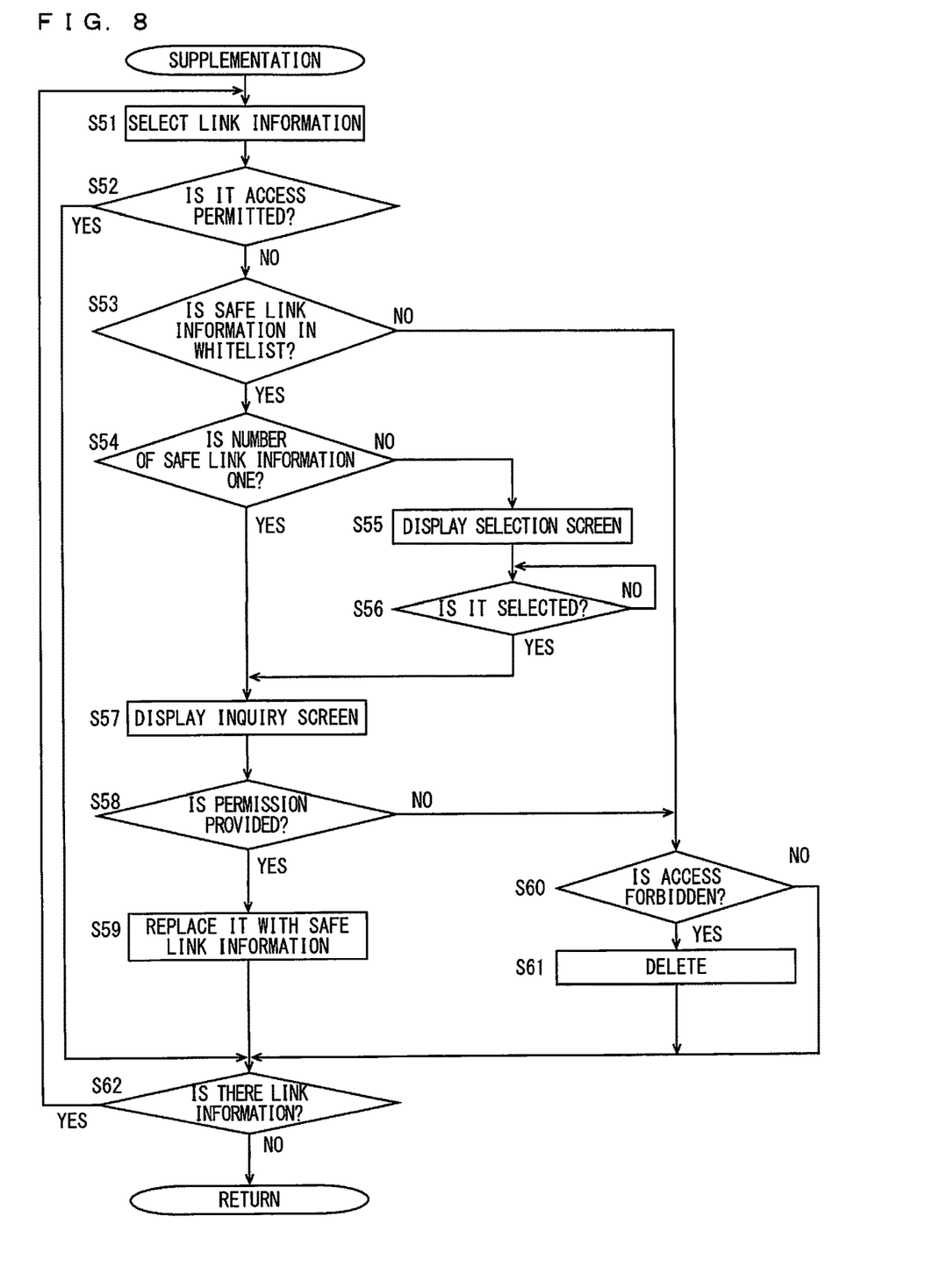
FIG. 8 is a flowchart showing one example of a flow of a supplementation process in one or more embodiments.

FIG. 8 is a flowchart showing one example of a flow of the supplementation process. The supplementation process is a process executed in the step S11 of the character recognition process. The correction information is produced before the supplementation process is executed, and the link information included in the correction information is specified. Referring to FIG. 8, the CPU 111 selects the link information to be processed (step S51), and the process proceeds to the step S52. In the step S52, the CPU 111 determines whether the link information that is selected as the link information to be processed is set as the link information to which access is permitted. If the link information is set as the link information to which access is permitted, the process proceeds to the step S62. If not, the process proceeds to the step S53.

In the step S53, the CPU 111 determines whether the safe link information is present in the whitelist. The safe link information is the link information registered in the whitelist and similar to the link information selected as the link information to be processed. If the safe link information is present, the process proceeds to the step S54. If not, the process proceeds to the step S60.

In the step S54, the CPU 111 determines whether the number of safe link information is one. A plurality of link information pieces similar to the link information to be processed might be registered in the whitelist. If the number of safe link information is one, the process proceeds to the step S57. If not, the process proceeds to the step S55. In the step S55, a selection screen is displayed, and the process proceeds to the step S56. The selection screen is a screen in which the user selects one from among the plurality of safe link information pieces. In the step S56, the process waits until one of the plurality of safe link information pieces is selected by the user. When one of the plurality of safe link information pieces is selected, the process proceeds to the step S57.

An inquiry screen is displayed in the step S57, and the process proceeds to the step S58. The inquiry screen is a screen for inquiring the user whether the link information is to be corrected with the safe link information. In the step S58, the CPU 111 determines whether the user has provided permission. In the case where the user inputs an operation of permitting the correction with the safe link information to the operation unit 163, the permission is accepted. If the user provides permission, the process proceeds to the step S59. If not, the process proceeds to the step S60. In the step S59, the link information that is selected to as the link information be processed is replaced with the safe link information, and the process proceeds to the step S62.

In the step S60, the CPU 111 determines whether the link information that is selected as the link information to be processed is set as the link information to which access is forbidden. If the link information is set as the link information to which access is forbidden, the process proceeds to the step S61. If not, the process proceeds to the step S62. The link information that is selected as the link information to be processed is deleted from the correction information in the step S61, and the process proceeds to the step S62.

In the step S62, the CPU 111 determines whether the link information that is not selected as the link information to be processed in the step SM is present. If unselected link information is present, the process returns to the step S51. If not, the process returns to the character recognition process.

As described above, the MFP 100 in one or more embodiments functions as an information processing apparatus, accepts an image received from the outside as an input image, recognizes characters in the input image, produces the character information constituted by a plurality of characters, detects the link information indicating a network address of data from the character information and corrects one or more character strings excluding a character string constituting the link information among the plurality of character strings included in the character information. Therefore, because not being corrected, the link information can be prevented from being converted into the information representing risky data.

Further, the MFP 100 detects the link information from the correction information generated after a character string included in the character information is corrected, and converts at least part of the link information included in the correction information to a character string before correction. Therefore, the character string that has not been detected as the link information before correction is detected as the link information after correction, and the link information is converted into the character string before correction. Therefore, probability of detecting the link information is increased, so that the link information can be prevented from being converted into the information representing risky data.

Further, because verifying accessibility to the data specified by the link information, the MFP 100 can determine whether the link information included in the character information is valid information.

Further, the MFP 100 confirms that access is permitted based on the whitelist defining the network addresses to which access is permitted. Therefore, the MFP 100 can determine that the link information included in the character information is safe.

Further, the MFP 100 selects a network address similar to the link information from the whitelist as safe link information, and replaces the portion corresponding to the link information with the safe link information. Therefore, the correction information can be prevented from including the information representing risky data.

Further, the MFP 100 replaces the link information with the safe link information in response to acceptance of permission by the user. Thus, the user can confirm the replacement.

Further, in the case where a plurality of safe link information pieces are selected, the MFP 100 accepts selection of one safe link information piece from among the plurality of safe link information pieces. Therefore, the user can confirm the link information after the replacement.

Further, the MFP 100 confirms that access to the data specified by the link information is forbidden. Therefore, forbidding of access to the data specified by the link information can be detected.

Further, the MFP 100 confirms that access to the data specified by the link information is forbidden. In the case where permission of access to the data is not confirmed, and forbidding of access to the data is not confirmed, the link information is added to the whitelist. Therefore, because being produced automatically, the whitelist is produced easily.

Further, the MFP 100 confirms forbidding of access based on the blacklist defining the network addresses to which access is forbidden. Therefore, the MFP 100 can determine that the link information is the information representing risky data.

Further, the MFP 100 confirms forbidding of access based on the computer virus definition data acquired from the outside. Therefore, the MFP 100 can determine that the link information is the information representing risky data.

Further, the MFP 100 notifies the user in the case where permission of access to the data is not confirmed, and forbidding of access to the data is confirmed. Therefore, the user can be warned not to access the risky data.

Further, the MFP 100 deletes the link information in the case where forbidding of access is confirmed. Therefore, the user can be prevented from accessing the data specified by the link information to which access is forbidden.

First Modification

The CPU 111 included in the MFP 100 in a first modified example does not have the post-correction detecting portion 61 and the converting portion 63 among the functions shown in FIG. 4. Thus, the CPU 111 in the first modified example does not detect the link information from the correction information. Thus, the link information is detected from the character information before correction is made by the correcting portion 55. The character string other than the link information in the character information is to be corrected, and the link information is not to be corrected.

The MFP 100 in the first modified example functions as an information processing apparatus, accepts an image received from the outside as an input image, recognizes characters in the input image, produces character information constituted by a plurality of characters, detects the link information representing network addresses of data from the character information and corrects one or more character strings other than the character string constituting the link information among the plurality of character strings included in the character information. Therefore, because not being corrected, the link information can be prevented from being converted into the information representing risky data.

Second Modification

The CPU 111 included in the MFP 100 in a second modified example does not have the pre-correction detecting portion 57 among the functions shown in FIG. 4. Therefore, although detecting the link information from the correction information, the MFP 100 in the second modified example does not detect the link information from the character information. Therefore, the link information is detected from the correction information after the correction is made by the correcting portion 55, and the link information in the correction information is converted into the character string before correction.

The MFP 100 in the second modified example accepts an image received from the outside as an input image, recognizes characters in the input image, produces character information constituted by a plurality of characters, corrects a character string included in the character information, detects the link information from the correction information after the character information is corrected and converts at least part of the link information included in the correction information into the character string before correction. Therefore, because not being corrected, the link information can be prevented from being converted into the information representing risky data.

Claims.

Although embodiments of the present invention have been described and illustrated in detail, the disclosed embodiments are made for purpose of illustration and example only and not limitation. The scope of the present invention should be interpreted by terms of the appended claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
a hardware processor that:
accepts an image input from outside as an input image;
recognizes a plurality of characters in the input image and produces character information that is constituted by the characters and that includes a plurality of character strings;
detects, from the character information, first link information representing a network address of data;
corrects one or more of the character strings other than a character string that constitutes the first link information among the character strings, and generates correction information;
verifies whether the data specified by the first link information is accessible; and
confirms that access is permitted based on a whitelist that defines a network address to which access is permitted.

2. The information processing apparatus according to claim 1, wherein
the hardware processor further:
detects second link information from the correction information; and
converts a character string that constitutes the second link information into the corresponding uncorrected character string.

3. The information processing apparatus according to claim 1, wherein
the hardware processor further:
selects, from the whitelist, a network address similar to the first link information as a piece of safe link information; and
replaces a portion corresponding to the first link information with the piece of safe link information.

4. The information processing apparatus according to claim 3, wherein
the hardware processor further replaces the first link information with the piece of safe link information in response to acceptance of permission by a user.

5. The information processing apparatus according to claim 4, wherein
when a plurality of pieces of the safe link information is selected, the hardware processor accepts selection of the plurality of pieces of the safe link information.

6. The information processing apparatus according to claim 1, wherein the hardware processor further confirms that access to the data specified by the first link information is forbidden.

7. The information processing apparatus according to claim 6, wherein
when neither permission nor forbidding of the access is confirmed, the hardware processor adds the first link information to the whitelist.

8. The information processing apparatus according to claim 7, wherein
when forbidding of the access is confirmed but permission of the access is not, the hardware processor notifies a user.

9. The information processing apparatus according to claim 6, wherein
the hardware processor further confirms that the access is forbidden based on a blacklist that defines a network address to which access is forbidden.

10. The information processing apparatus according to claim 6, wherein
the hardware processor further confirms that the access is forbidden based on computer virus definition data acquired from outside.

11. The information processing apparatus according to claim 6, wherein
when forbidding of the access is confirmed, the hardware processor deletes the first link information.

12. An information processing apparatus comprising:
a hardware processor that:
accepts an image input from outside as an input image;
recognizes a plurality of characters in the input image and produces character information that is constituted by the characters and that includes a character string;
corrects the character string in the character information, and generates correction information;
detects link information representing a network address of data from the correction information;
converts a character string that constitutes the link information into the corresponding uncorrected character string;
verifies whether the data specified by the link information is accessible; and
confirms that access is permitted based on a whitelist that defines a network address to which access is permitted.

13. The information processing apparatus according to claim 12, wherein
the hardware processor further:
selects, from the whitelist, a network address similar to the link information as a piece of safe link information; and
replaces a portion corresponding to the link information with the piece of safe link information.

14. The information processing apparatus according to claim 13, wherein
the hardware processor further replaces the link information with the piece of safe link information in response to reception of permission by a user.

15. The information processing apparatus according to claim 14, wherein
when a plurality of pieces of the safe link information is selected, the hardware processor accepts selection of the plurality of pieces of the safe link information.

16. The information processing apparatus according to claim 12, wherein
the hardware processor further confirms that access to the data specified by the link information is forbidden.

17. The information processing apparatus according to claim 16, wherein
when neither permission nor forbidding of the access is confirmed, the hardware processor adds the link information to the whitelist.

18. The information processing apparatus according to claim 17, wherein
when forbidding of the access is confirmed but permission of the access is not, the hardware processor notifies a user.

19. The information processing apparatus according to claim 16, wherein
the hardware processor further confirms forbidding of the access based on a blacklist that defines a network address to which access is forbidden.

20. The information processing apparatus according to claim 16, wherein
the hardware processor further confirms that the access is forbidden based on computer virus definition data acquired from outside.

21. The information processing apparatus according to claim 16, wherein
when forbidding of access is confirmed, the hardware processor deletes the link information.

22. A character recognition method executed by an information processing apparatus, the method comprising:
accepting an image input from outside as an input image;
recognizing a plurality of characters in the input image and producing character information that is constituted by the characters and that includes a plurality of character strings;
detecting, from the character information, first link information representing a network address of data;
correcting one or more of the character strings other than a character string that constitutes the first link information among the character strings, and generates correction information;
verifying whether the data specified by the first link information is accessible; and
confirming that access is permitted based on a whitelist that defines a network address to which access is permitted.

23. The character recognition method according to claim 22, further comprising:
detecting second link information from the correction information; and
converting a character string that constitutes the second link information into the corresponding uncorrected character string.

24. A character recognition method executed by an information processing apparatus, the method comprising:
accepting an image input from outside as an input image;
recognizing a plurality of characters in the input image and producing character information that is constituted by the characters and that includes a character string;
correcting the character string in the character information, and generates correction information;
detecting link information representing a network address of data from the correction;
converting a character string that constitutes the link information into the corresponding uncorrected character string;
verifying whether the data specified by the link information is accessible; and
confirming that access is permitted based on a whitelist that defines a network address to which access is permitted.

25. A non-transitory computer-readable recording medium encoded with character recognition instructions executed by a computer that controls an information processing apparatus, the instructions cause the computer to:
- accept an image input from outside as an input image;
- recognize a plurality of characters in the input image and produce character information that is constituted by the characters and that includes a plurality of character strings;
- detect, from the character information, first link information representing a network address of data;
- correct one or more of the character strings other than a character string that constitutes the first link information among the character strings, and generates correction information;
- verify whether the data specified by the first link information is accessible; and
- confirm that access is permitted based on a whitelist that defines a network address to which access is permitted.

26. The non-transitory computer-readable recording medium according to claim 25, wherein
the instructions further cause the computer to:
- detect second link information from the correction information; and
- convert a character string that constitutes the second link information to the corresponding uncorrected character string.

27. A non-transitory computer-readable recording medium encoded with a character recognition instructions executed by a computer that controls an information processing apparatus, the instructions cause the computer to:
- accept an image input from outside as an input image;
- recognize a plurality of characters in the input image and produce character information that is constituted by the characters and that includes a character string;
- correct the character string in the character information, and generates correction information;
- detect link information representing a network address of data from the correction information;
- convert a character string that constitutes the link information into the corresponding uncorrected character string;
- verify whether the data specified by the link information is accessible; and
- confirm that access is permitted based on a whitelist that defines a network address to which access is permitted.

* * * * *